US012479333B2

(12) United States Patent
Fujita et al.

(10) Patent No.: US 12,479,333 B2
(45) Date of Patent: Nov. 25, 2025

(54) POWER CONTROL APPARATUS FOR VEHICLE

(71) Applicant: HONDA MOTOR CO., LTD., Tokyo (JP)

(72) Inventors: Yuji Fujita, Tokyo (JP); Yu Yamamoto, Tokyo (JP); Atsushi Saito, Tokyo (JP); Keita Kishi, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 295 days.

(21) Appl. No.: 18/190,141

(22) Filed: Mar. 27, 2023

(65) Prior Publication Data

US 2023/0311708 A1    Oct. 5, 2023

(30) Foreign Application Priority Data

Mar. 31, 2022  (JP) .................. 2022-060319

(51) Int. Cl.
    *B60L 58/26*    (2019.01)
(52) U.S. Cl.
    CPC ......... *B60L 58/26* (2019.02); *B60L 2240/545* (2013.01); *B60L 2240/549* (2013.01)
(58) Field of Classification Search
    CPC ............. B60L 58/26; B60L 2240/545; B60L 2240/549
    See application file for complete search history.

(56) References Cited

U.S. PATENT DOCUMENTS

| | | | | |
|---|---|---|---|---|
| 5,929,609 A | * | 7/1999 | Joy .................. | H02J 7/1446 322/29 |
| 9,893,394 B2 | * | 2/2018 | Shin .................. | H01M 10/6551 |
| 10,396,570 B2 | * | 8/2019 | Loncarevic .......... | H02J 7/0014 |
| 11,442,110 B2 | * | 9/2022 | Talukdar .............. | G01R 31/371 |
| 2009/0088993 A1 | | 4/2009 | Oohasi et al. | |
| 2010/0033135 A1 | | 2/2010 | Nishida et al. | |
| 2012/0016547 A1 | | 1/2012 | Aridome et al. | |
| 2013/0179012 A1 | | 7/2013 | Hermann et al. | |

(Continued)

FOREIGN PATENT DOCUMENTS

| | | |
|---|---|---|
| CN | 110228369 A | 9/2019 |
| CN | 113071369 A | 7/2021 |
| JP | 2019140827 A | 8/2019 |

OTHER PUBLICATIONS

Office Action issued Jul. 14, 2025 in the U.S. Appl. No. 18/190,048.

*Primary Examiner* — Gertrude Arthur Jeanglaude

(74) *Attorney, Agent, or Firm* — CKC & Partners Co., LLC

(57) ABSTRACT

An IPU for a vehicle includes a battery that supplies power to a drive unit of a vehicle, a current sensor that detects current of the battery, a temperature sensor that detects temperature of the battery, contactors that cut off the flow of electrical current from the battery and the flow of electrical current to the battery, and a battery ECU that, when a current detection function by the current sensor has been lost, measures a period of time for which a temperature detected by the temperature sensor reaches a second predetermined value from a first predetermined value and, when the measured period of time is less than a predetermined period of time, operates the contactors to cut off the flow of electrical current from the battery and the flow of electrical current to the battery.

2 Claims, 2 Drawing Sheets

(56) References Cited

U.S. PATENT DOCUMENTS

| | | |
|---|---|---|
| 2019/0252906 A1 | 8/2019 | Kusumi |
| 2022/0289030 A1 | 9/2022 | Pressman et al. |
| 2023/0311675 A1* | 10/2023 | Fujita ..................... B60L 50/60 180/65.1 |

* cited by examiner

POWER CONTROL APPARATUS FOR VEHICLE

This application is based on and claims the benefit of priority from Japanese Patent Application No. 2022-060319, filed on 31 Mar. 2022, the content of which is incorporated herein by reference.

BACKGROUND OF THE INVENTION

Field of the Invention

The present invention relates to a power control apparatus for a vehicle.

Related Art

In recent years, research and development have been conducted on batteries that contribute to increased efficiency in energy in order to ensure access for more people to energy which is affordable, reliable, sustainable and advanced.

For example, a system has been disclosed which is configured to detect an overcurrent internal short circuit in a mounted battery pack in a vehicle equipped with a battery (for example, refer to U.S. Published Patent Application Publication, No. 2013-0179012).

Patent Document 1: U.S. Published Patent Application Publication, No. 2013-0179012, Specification

SUMMARY OF THE INVENTION

However, protocols relating to overcurrent of the battery have been newly set in the vehicle safety level (ASIL: Automotive Safety Integrity Level), and now it is necessary to detect overcurrent of the battery and protect the battery even when the overcurrent detection function has been lost. Due to such a situation, in a vehicle equipped with the system disclosed in U.S. Published Patent Application Publication, No. 2013-0179012, when the overcurrent detection function is lost, it is necessary to stop the charging of the battery, and it is necessary to stop the driving of the vehicle.

The present invention has been made in view of the above situation, and an object of the present invention is to provide a power control apparatus for a vehicle capable of continuing charging of a battery or driving of a vehicle even when an overcurrent detection function is lost.

A power control apparatus (for example, the IPU 3 to be described later) for a vehicle (for example, a vehicle 1 to be described later) according to an embodiment of the present invention includes: a battery (for example, a battery 30 to be described later) that supplies power to a drive unit (for example, a drive unit 2 to be described later) of a vehicle; a current sensor (for example, a current sensor 33 to e described later) that detects current of the battery; a temperature sensor (for example, a temperature sensor 31 to be described later) that detects temperature of the battery; a cutoff element (for example, contactors 34b and 34c) that cuts off a flow of electrical current from the battery and a flow of electrical current to the battery and a controller (for example, a battery ECU 35 to be described later) that, when a current detection function of the current sensor has been lost, measures a period of time for which a temperature detected by the temperature sensor reaches a second predetermined value from a first predetermined value and, when the measured period of time is less than a predetermined period of time, operates the cutoff element to cut off the flow of electrical current from the battery and the flow of electrical current to the battery.

According to the first aspect of the power control apparatus of the vehicle of the invention, when a current detection function of the current sensor has been lost, the controller measures a period of time for which a temperature detected by the temperature sensor reaches a second predetermined value from a first predetermined value and, when the measured period of time is less than a predetermined period of time which indicates the occurrence of heat generation due to overcurrent, operates the cutoff element to cut off the flow of electrical current from the battery and the flow of electrical current to the battery. With such a configuration, even when the current detection function of the current sensor has been lost, it is possible to prevent an excessive temperature rise of the battery, and thus, it is not necessary to stop the charging of the battery or the driving of the vehicle in order to avoid the excessive temperature rise. Therefore, according to the first aspect of the power control apparatus for a vehicle of the invention, it is possible to continue charging of the battery and driving of the vehicle even when the current detection function has been lost.

According to the second aspect of the invention, the power control apparatus for a vehicle in the first aspect of the invention further includes a cooler (for example, an unillustrated water cooling mechanism to be described later) that cools the battery, in which the predetermined period of time are set based on a heat generation characteristic of the battery and a cooling characteristic of the cooler.

According to the power control apparatus for a vehicle of the second aspect of the invention, since the predetermined period of time serving as conditions for operating the cutoff element are set based on the heat generation characteristic of the battery and the cooling characteristic of the cooler, it is possible to reliably prevent an excessive temperature rise of the battery.

According to an embodiment of the present invention, it is possible to provide a power control apparatus for a vehicle capable of continuing charging of a battery or driving of a vehicle even when a current detection function has been lost. Thus, the present invention contributes to energy efficiency.

DETAILED DESCRIPTION OF THE INVENTION

An embodiment of the present invention will now be described in detail with reference to the accompanying drawings.

Figure 1:
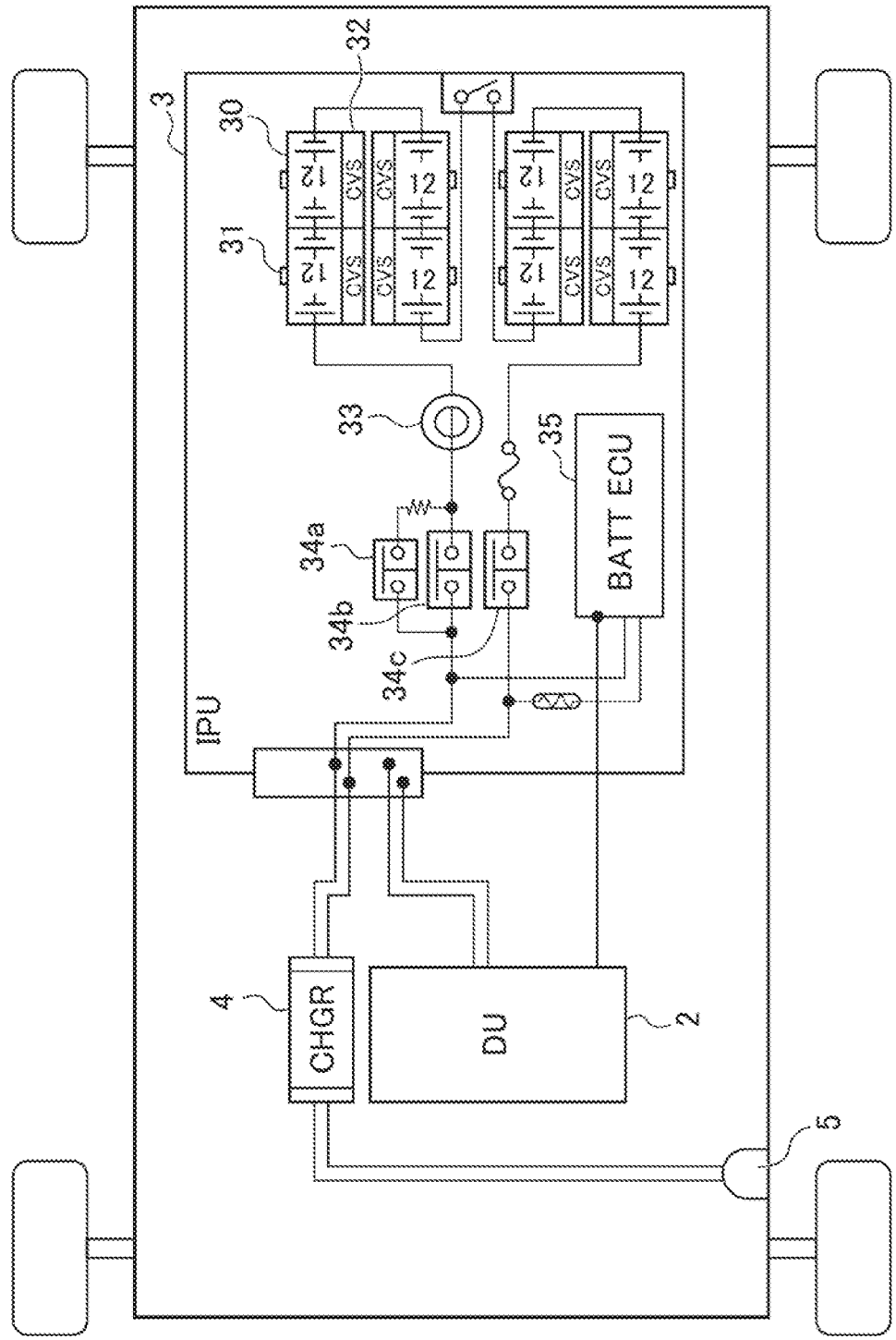
FIG. 1 is a schematic diagram showing a configuration of a vehicle equipped with an IPU according to an embodiment of the present invention.

First, a configuration of a vehicle 1 equipped with an IPU (Intelligent Power Unit) 3 according to an embodiment of the present invention will be described with reference to FIG. 1. FIG. 1 is a schematic diagram showing a configuration of the vehicle 1 equipped with the IPU 3 according to an embodiment of the present invention.

As shown in FIG. 1, the vehicle 1 includes a drive unit 2, the IPU 3, a charger 4, a plug 5, and the like. That is, the vehicle 1 of the present embodiment is a plug-in hybrid vehicle.

The drive unit 2 runs the vehicle 1 using power supplied from the IPU 3. The drive unit 2 includes, for example, an engine and a motor as a power source, and a FI-ECU and a PCU which control the engine and the motor.

The IPU 3 includes a battery pack for driving the drive unit 2, and functions as a power control apparatus for the vehicle 1. Specifically, the IPU 3 includes a plurality of batteries 30, a plurality of temperature sensors 31, a plurality of voltage sensors 32, a current sensor 33, a plurality of contactors 34a, 34b and 34c, a battery ECU 35, and a water cooling mechanism (not shown).

The battery 30 is a high-voltage battery that is charged by the charger 4 and supplies electric power to the drive unit 2 by discharging. The battery 30 of the present embodiment is, for example, a large-capacity battery in which a plurality of battery cells configured by lithium ion secondary batteries are connected in series.

The temperature sensor 31 functions as a temperature sensor that detects the temperature of the battery 30. In the present embodiment, a plurality of temperature sensors 31 are provided, for example, for each stack of a plurality of battery cells, and the temperature sensor 31 detects the temperature of each stack.

The voltage sensors 32 each function as a voltage sensor that detects the voltage of the battery 30. The voltage sensor 32 of the present embodiment is, for example, a CVS (Cell Voltage Sensor). The voltage sensor 32 is provided, for example, for each of a plurality of stacks included in the battery 30, and detects the voltage of each stack.

The current sensor 33 functions as a current sensor that detects the electrical current of the battery 30. The current sensor 33 of the present embodiment is, for example, an ISOC (I State of Charge) sensor.

The contactor 34a operates at the time of activation, and the contactors 34b and 34c operate at the time of vehicle travel, battery charging, or the like other than at the time of activation. The contactors 34b and 34c are respectively a positive contactor and a negative contactor, and cut off electrical current flow from the battery 30 and electrical current flow to the battery 30. That is, the contactors 34b and 34c cut off the supply of electric power from the battery 30 to the drive unit 2 at a high voltage, and cut off the supply of regenerative electric power from the drive unit 2 to the battery 30 at a high voltage. The contactors 34b and 34c cut off the supply of power from the charger 4, which is connected to an external power supply device (not shown) via the plug 5, to the battery 30 at a high voltage.

The battery ECU 35 integrally controls the IPU 3. The battery ECU 35 determines whether or not the current detection function by the current sensor 33 has been lost. Specifically, when a detected value of the current sensor 33 is an abnormal value, the battery ECU 35 detects a failure in the current sensor 33, and determines that the current detection function by the current sensor 33 has been lost. It is possible to determine whether or not the detected value of the current sensor 33 is an abnormal value based on a power charge-discharge history of the battery 30, for example.

Further, when the current detection function by the current sensor 33 has been lost, the battery ECU 35 measures a period of time in which the highest temperature among the temperatures detected by the plurality of temperature sensors 31 reaches a second predetermined value (for example, 45° C.) from a first predetermined value (for example, 40° C.) and, when the measured value is less than a predetermined period of time (for example, 200 seconds), operates the contactors 34b and 34c to cut off the flow of electrical current from the battery 30 and the flow of electrical current to the battery 30.

A predetermined period of time, which is a condition under which the battery ECU 35 operates the contactors 34b and 34c, are appropriately set based on heat generation characteristics of the battery 30 and cooling characteristics of a water cooling mechanism (not shown). The predetermined period of time will be described later in detail.

The charger 4 charges the battery 30 by being connected to an external power supply device (not shown) via the plug 5.

The water cooling mechanism (not shown) functions as a cooling means for cooling the battery 30 which generates heat. The water cooling mechanism is provided below the battery 30, for example, and cools the battery 30.

Figure 2:
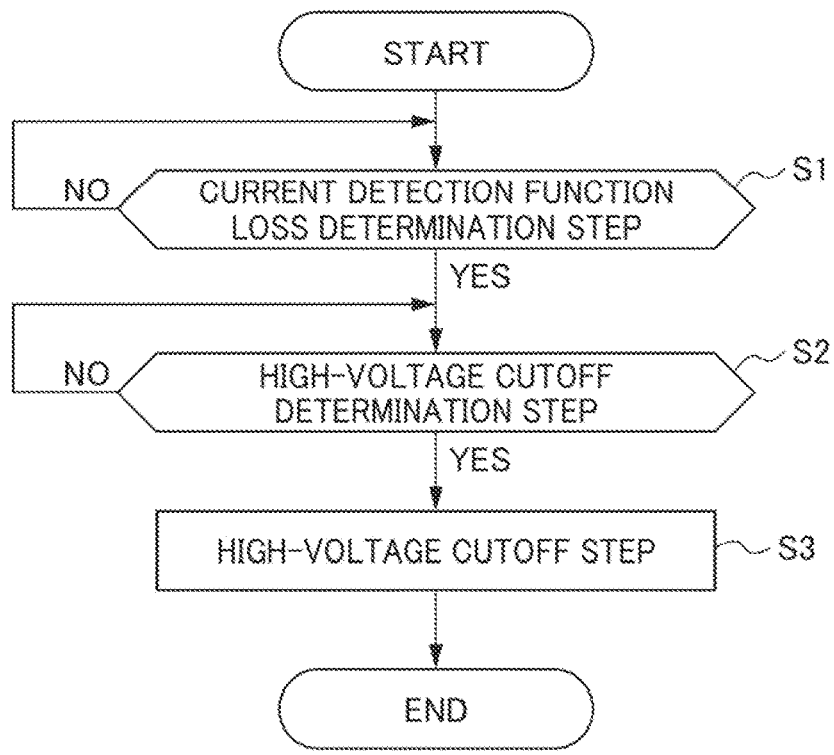
FIG. 2 is a flowchart illustrating high-voltage cutoff processing in the IPU.

Next, with reference to FIG. 2, a description will be provided for high-voltage cutoff processing in the IPU 3. FIG. 2 is a flowchart illustrating the high-voltage cutoff processing in the IPU 3.

As shown in FIG. 2, the high-voltage cutoff processing in the IPU 3 includes a current detection function loss determination step S1, a high-voltage cutoff determination step S2, and a high-voltage cutoff step S3. The high-voltage cutoff processing in the IPU 3 starts together with the IG-ON of the vehicle 1.

In the current detection function loss determination step S1, the battery ECU 35 determines whether or not the current detection function by the current sensor 33 has been lost. When the current detection function by the current sensor 33 has been lost (YES in step S1), the processing advances to the high-voltage cutoff determination step S2. When the current detection function by the current sensor 33 has not been lost (NO in step S1), the current detection function lost determination step S1 is repeated.

In the high voltage cutoff determination step S2, the battery ECU 35 measures a period of time for which the temperature detected by the temperature sensor 31 reaches a second predetermined value (for example, 45° C.) from a first predetermined value (for example, 40° C.), and determines whether the measured period of time is less than a predetermined period of time (for example, 200 seconds). When the period of time measured by the battery ECU 35 is less than a predetermined period of time (for example, 200 seconds) (YES in step S2), the processing advances to a high-voltage cutoff step S3. When the period of time measured by the battery ECU 35 is not less than a predetermined period of time (for example, 200 seconds) (NO in step S2), the high-voltage cutoff determination step S2 is repeated.

Figure 3:
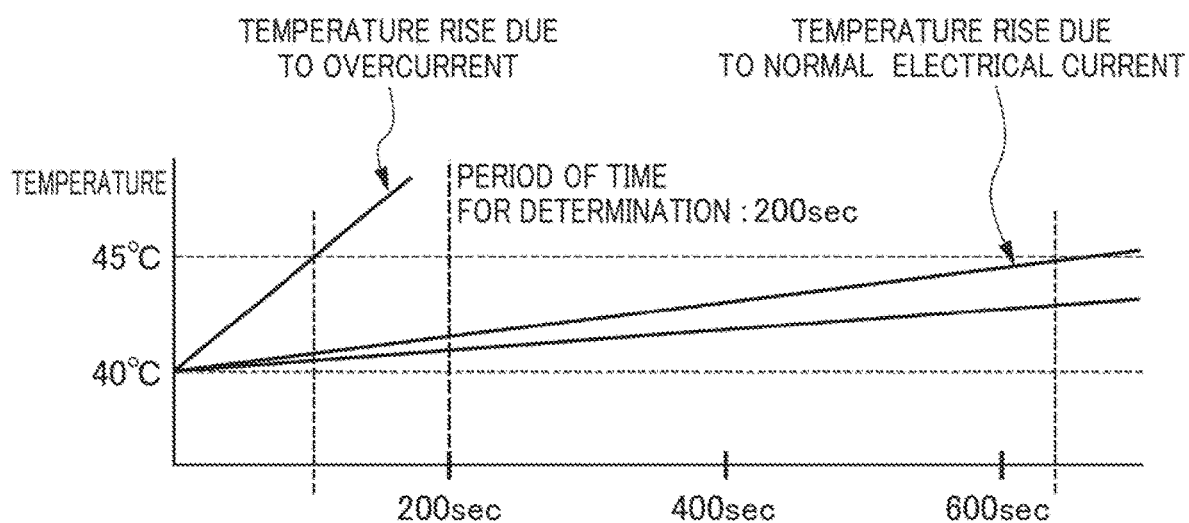
FIG. 3 is a diagram showing a condition for operating a contactor.

FIG. 3 is a diagram showing a condition for operating the contactors 34b and 34c. The line indicating the temperature rise due to overcurrent in FIG. 3 corresponds to the case of YES in step S2. On the other hand, the line indicating the temperature rise due to normal current corresponds to the case of NO in step S2.

With reference to FIG. 2 again, in the high-voltage cutoff step S3, the battery ECU 35 operates the contactors 34b and 34c to cut off the flow of electrical current from the battery 30 and the flow of electrical current to the battery 30 at a high voltage (for example, a voltage of 12 kW or more). After the cutoff, the processing ends.

According to the present embodiment, the following advantageous effects are achieved.

According to the IPU 3, when the current detection function by the current sensor 33 has been lost, the battery ECU 35 measures a period of time for which the temperature detected by the temperature sensor 31 reaches a second predetermined value (for example, 45° C.) from a first predetermined value (for example, 40° C.) and, when the measured period of time is less than a predetermined period of time, operates the contactors 34b and 34c to cut off the flow of electrical current from the battery 30 and the flow of electrical current to the battery 30. With such a configuration, even when the current detection function of the current sensor 33 has been lost, the battery 30 can be prevented from being excessively heated, so that it is not necessary to stop the charging of the battery 30 or the driving of the vehicle 1 in order to avoid the excessive temperature rise. Therefore, according to the IPU 3 of the vehicle 1 according to the present embodiment, it is possible to continue the charging of the battery 30 and the driving of the vehicle 1 even when the current detection function is lost.

Further, according to the IPU 3, a predetermined period of time serving as a condition for operating the contactors 34b and 34c, is set based on the heat generation characteristics of the battery 30 and the cooling characteristics of a water cooling mechanism (not shown). With such a configuration, according to the present embodiment, it is possible to reliably prevent an excessive temperature rise of the battery 30.

It should be noted that the present invention is not limited to the above embodiment, and that modifications, improvements, and the like are included in the present invention as long as the object of the present invention can be achieved.

For example, in the above embodiment, the present invention is applied to a plug-in hybrid vehicle. However, the present invention is not limited thereto. The present invention is widely applicable to vehicles including a high-voltage battery that supplies power to a drive unit of the vehicle.

EXPLANATION OF REFERENCE NUMERALS

1 vehicle
2 drive unit
3 IPU (power control apparatus)
30 battery
31 temperature sensor
32 voltage sensor
33 current sensor
34a, 34b, 34c, contactor (cutoff element)
35 battery ECU (controller)
4 charger
5 plug
S1: current detection function loss determination step
S2 high-voltage cutoff determination step
S3 high-voltage cutoff step

What is claimed is:

1. A power control apparatus for a vehicle, comprising:
a battery that supplies power to a drive unit of a vehicle;
a current sensor that detects electrical current of the battery;
a temperature sensor that detects temperature of the battery;
a cutoff element that cuts off a flow of electrical current from the battery and a flow of electrical current to the battery; and
a controller that, when a current detection function of the current sensor has been lost, measures a period of time for which a temperature detected by the temperature sensor reaches a second predetermined value from a first predetermined value and, when the measured period of time is less than a predetermined period of time, operates the cutoff element to cut off the flow of electrical current from the battery and the flow of electrical current to the battery.

2. The power control apparatus for a vehicle according to claim 1, further comprising a cooler that cools the battery, wherein the predetermined period of time is set based on a heat generation characteristic of the battery and a cooling characteristic of the cooler.

* * * * *